United States Patent
Zhao et al.

(10) Patent No.: US 7,580,355 B2
(45) Date of Patent: Aug. 25, 2009

(54) METHOD OF PERFORMING WEIGHTED ROUND-ROBIN QUEUE SCHEDULING USING A DYNAMIC LINK LIST AND STRUCTURE FOR IMPLEMENTING SAME

(75) Inventors: Yongdong Zhao, Plano, TX (US); Craig A. Lindahl, McKinney, TX (US)

(73) Assignee: Integrated Device Technology, Inc., San Jose, CA (US)

( * ) Notice: Subject to any disclaimer, the term of this patent is extended or adjusted under 35 U.S.C. 154(b) by 647 days.

(21) Appl. No.: 10/926,795

(22) Filed: Aug. 25, 2004
(Under 37 CFR 1.47)

(65) Prior Publication Data
US 2005/0147034 A1 Jul. 7, 2005

Related U.S. Application Data

(60) Provisional application No. 60/497,883, filed on Aug. 25, 2003.

(51) Int. Cl.
*G08C 15/00* (2006.01)
*H04L 12/28* (2006.01)
*H04J 3/16* (2006.01)

(52) U.S. Cl. .................. 370/230.1; 370/412; 370/468
(58) Field of Classification Search ......... 370/230-232, 370/235, 412-418, 464-468, 429
See application file for complete search history.

(56) References Cited

U.S. PATENT DOCUMENTS

| | | | |
|---|---|---|---|
| 5,748,614 A | | 5/1998 | Wallmeier |
| 5,864,540 A | * | 1/1999 | Bonomi et al. ............... 370/235 |
| 6,064,677 A | | 5/2000 | Kappler et al. |
| 6,101,193 A | | 8/2000 | Ohba |
| 6,134,217 A | | 10/2000 | Stiliadis et al. |
| 6,137,807 A | | 10/2000 | Rusu et al. |
| 6,154,446 A | | 11/2000 | Kadambi et al. |
| 6,198,723 B1 | | 3/2001 | Parruck et al. |
| 6,208,652 B1 | * | 3/2001 | Stephens et al. ....... 370/395.41 |

(Continued)

OTHER PUBLICATIONS

Efficient Fair Queuing Using Deficit Round Robin by M. Shreedhar and George Varghese, Oct. 16, 1995, pp. 1-22.

(Continued)

*Primary Examiner*—Aung S Moe
*Assistant Examiner*—Kerri M Rose
(74) *Attorney, Agent, or Firm*—Bever Hoffman & Harms

(57) ABSTRACT

A weighted round-robin scheduler includes a round-robin table that stores a plurality of cycle link lists. Each cycle link list includes a head flow identification (FLID) value identifying a first flow of the cycle link list, and a tail FLID value identifying a last flow of the cycle link list. A flow table is provided having a plurality of flow table entries. Each flow table entry is associated with a corresponding flow. Each flow table entry stores a parameter that identifies the weight assigned to the associated flow. A packet queue is associated with each flow table entry, wherein each packet queue is capable of storing a plurality of packets. The weighted round-robin scheduler also includes an idle cycle register having an idle cycle entry corresponding with each of the cycle link lists, wherein each idle cycle entry identifies the corresponding cycle link list as active or idle.

22 Claims, 14 Drawing Sheets

U.S. PATENT DOCUMENTS

| | | |
|---|---|---|
| 6,247,061 B1 | 6/2001 | Douceur et al. |
| 6,810,426 B2 | 10/2004 | Mysore et al. |
| 7,269,180 B2 * | 9/2007 | Bly et al. .................... 370/412 |
| 2002/0136230 A1 * | 9/2002 | Dell et al. .................... 370/416 |
| 2002/0167955 A1 | 11/2002 | Shimojo |
| 2002/0178282 A1 | 11/2002 | Mysore et al. |
| 2003/0179774 A1 | 9/2003 | Saidi et al. |
| 2003/0214964 A1 | 11/2003 | Shoham et al. |
| 2004/0114617 A1 * | 6/2004 | Sim et al. .................... 370/413 |

OTHER PUBLICATIONS

Buffer Memory Technologies and Architectures; Dept. of Computer Science, University of Crete, Greece; Nov. 29, 2001; pp. 1-23.

* cited by examiner

METHOD OF PERFORMING WEIGHTED ROUND-ROBIN QUEUE SCHEDULING USING A DYNAMIC LINK LIST AND STRUCTURE FOR IMPLEMENTING SAME

RELATED APPLICATION

The present application is based on and claims priority of U.S. provisional Patent Application Ser. No. 60/497,883 filed by Yongdong Zhao and Craig A. Lindahl on Aug. 25, 2003.

BACKGROUND OF THE INVENTION

1. Field of the Invention

The present invention relates to an improved queuing method for implementing weighted round-robin (WRR) scheduling for high-speed packet switching and routing.

2. Related Art

Queuing and scheduling are two critical function blocks that are used by today's packet switches and routers to support quality of services (QoS). A typical packet switch/router has multiple ports forwarding and receiving data packets. Usually a data packet enters a switch/router from one port and departs from another port. The switch/router ports can each receive and forward data packet simultaneously.

FIG. 1 is a block diagram of a high-level switch/router architecture 100 that includes switch ports 101-108 and switch/router 110. Switch/router 110 includes line cards 111-118 and switch fabric 120. Data packets arrive at the left hand side switch ports 101-104 (i.e., ingress ports) and are provided to the corresponding line cards 111-114. The data packets are then processed by switch fabric 120, and then depart from the right hand side ports 105-108 (i.e., egress ports) via line cards 115-118.

During normal operation, multiple packets may be received from several ingress ports and leave switch/router 110 on one egress port. These packets must be queued in front of the egress port to wait for an opportunity to be forwarded.

FIG. 2 is a block diagram of line card 115, which includes multiple queues $201_1$-$201_N$ for storing data packets received from ingress ports 101-104, and scheduler 210. Each of queues $201_1$-$201_N$ is controlled by scheduler 210. Based on QoS requirements, scheduler 210 selects one of queues $201_1$-$201_N$ to send data packets over the egress port 105.

Different queuing and scheduling algorithms are implemented in switches and routers to meet various QoS requirements. The simplest is the First-In-First-Out (FIFO) scheme where packets are stored in one queue and sent in the same order as they are received. The drawback of the FIFO scheme is that bandwidth is not distributed fairly among all of the traffic flows. A few aggressive flows can seize most of the bandwidth. To solve this problem, a per-flow queue based scheduling algorithm, called the round-robin (RR) scheduling scheme, has been introduced. The idea of round-robin scheduling, in essence, is that traffic from different flows are queued separately in their own queues and the switch/router port scheduler circularly and repeatedly "visits" all the packet queues, and sends one packet from each queue during the visit. In terms of distributing bandwidth among different flows, round-robin scheduling is a fairer solution than FIFO scheduling because each flow can be guaranteed the opportunity to send a packet in each round-robin scheduling cycle.

However, round-robin scheduling has two problems. The first problem is that this scheme cannot differentiate large packets from small packets. When a flow sends a packet ten times larger than packets sent by other flows, this flow uses ten times more bandwidth than the other flows. To be fair, the packet length has to be taken into consideration in the scheduling algorithm. In addition, in real network environments, different flows can have different bandwidth requirements and should not be treated as equal. In other words, each flow is given a weighting factor and the bandwidth should be distributed to all the flows proportional to their weights. Weighted round-robin (WRR) scheduling is based on the round-robin scheduling algorithm, but also incorporates a technique for distributing the bandwidth according to the weights of the various flows.

There are different ways of implementing weighted round-robin scheduling. One popular approach is to provide transmit opportunities to each flow on a periodic, cyclic basis, as with round-robin scheduling, but instead of only accepting one packet, multiple packets from each queue can be forwarded. The number of packets transmitted is determined in response to the weight assigned to the flow. For instance, a queue with a weight equal to 2 can have two packets forwarded, while a queue with a weight of 10 can have 10 packets forwarded during each visit by the scheduler. This method is relatively simple to implement. Although this method is efficient at processing backlogged queues, it has the negative effect of forwarding the packets from each flow in a clumped manner (e.g., 10 packets at a time) rather than a smooth manner (e.g., 1 packet at a time).

The real problem with the above-described weighted round-robin scheduling is that it fails to work properly when the network is not heavily loaded. For example, assume that there are 64K flow queues. Further assume that the first queue has a weight equal to 10, while all of the other queues have a weight equal to 1. Ten packets are supposed to be sent from the first queue, and one packet is supposed to be sent from each of the other queues during each visit by the scheduler. If there is only one packet waiting in the first queue, the scheduler will forward this packet, and then move to service the other queues. Suppose that more packets arrive in the first queue after the scheduler has left the first queue. The scheduler cannot come back to the first queue until after the scheduler has visited each of the other (64K−1) queues. During the described round-robin cycle, only one packet is forwarded from the first queue (i.e., the same number as is forwarded for each of the other queues). In this case, the first queue does not receive ten times the bandwidth of the other queues, as suggested by the weight of the first queue.

It would therefore be desirable to have an improved technique for solving the above-described deficiencies of conventional weighted round-robin scheduling.

SUMMARY

Accordingly, the present invention provides an improved method for implementing weighted round-robin (WRR) scheduling. In accordance with one embodiment of the present invention, a dynamic queue link list is used to implement an improved weighted round-robin scheduling technique.

In accordance with one embodiment of the present invention, packets received from various flows are enqueued as follows. Each of the packets is received from an associated flow. Each flow is identified by a unique flow identification (FLID) value. All received packets having the same FLID value are stored in the same packet queue (i.e., there is a packet queue associated with each of the flows). Each packet queue is organized and maintained using a flow table entry. Each flow table entry stores the address of the first packet queue and the address of the last packet in the packet queue. A pre-pended header is added to each of the received packets.

This pre-pended header includes a next address pointer, which identifies the address of the next packet in the packet queue.

Each flow table entry also stores a WRR cycle (WRR_CYC) value that identifies the assigned weight of the associated flow, a WRR burst value that identifies the number of packets that can be dequeued during a single visit from the WRR scheduler, a WRR opportunity value that identifies the number of packets that have actually been dequeued during a visit from the WRR scheduler, and a packet count value that indicates the number of packets currently stored in the associated packet queue.

The WRR scheduler determines the cycle number in which a packet queue is to be processed in response to the WRR_CYC value. The WRR scheduler visits a flow once during a period of WRR_CYC cycles. In general, the cycle in which a packet queue is to be visited by the WRR scheduler is determined by adding the WRR_CYC value to a current cycle number.

The weighted round-robin scheduler also includes a round-robin table that stores a plurality (N) of cycle link lists, one for each cycle. Each cycle link list includes a head flow identification (FLID) value identifying a first flow of the cycle link list, and a tail FLID value identifying a last flow of the cycle link list. Each flow table entry further includes a next FLID pointer, which identifies the next flow table entry in the cycle link list. In this manner all of the packets to be sent to the egress port during a particular cycle are linked.

An idle cycle register is provided in accordance with one embodiment of the present invention. The idle cycle register includes a 1-bit idle cycle indicator for each cycle. If a cycle link list is linked to at least one flow table entry (i.e., at least one packet waiting to be dequeued), then the associated idle cycle indicator is de-activated, thereby indicating that the cycle link list is active (not idle). Conversely, if a cycle link list is linked to no flow table entries, then the associated idle cycle indicator is activated, thereby indicating that the cycle link list is idle. The WRR scheduler only processes active cycle link lists, thereby improving processing speed (i.e., packet throughput).

When an active cycle link list is processed, one or more packets of each flow identified by an active cycle link list are sent to the egress port. The number of packets sent from each flow is determined by the WRR burst, WRR opportunity and packet count values. More specifically, the WRR opportunity value is initially set equal to the WRR burst value. The WRR opportunity value is then decremented each time that a packet is sent. Similarly, the packet count value is decremented each time that a packet is sent. Packets are sent until the WRR opportunity value or the packet count value reaches zero, whichever comes first. At this time, the WRR opportunity value is set equal to the WRR burst value. If there are still packets remaining in the packet queue (i.e., the packet count value is greater than zero), then the flow is added to another cycle link list, as determined by the WRR_CYC value.

After each flow in the active cycle link list has been processed, the current cycle link list becomes idle, and the WRR scheduler continues processing with the next non-idle cycle link list.

The present invention will be more fully understood in view of the following description and drawings.

DETAILED DESCRIPTION

Figure 1:
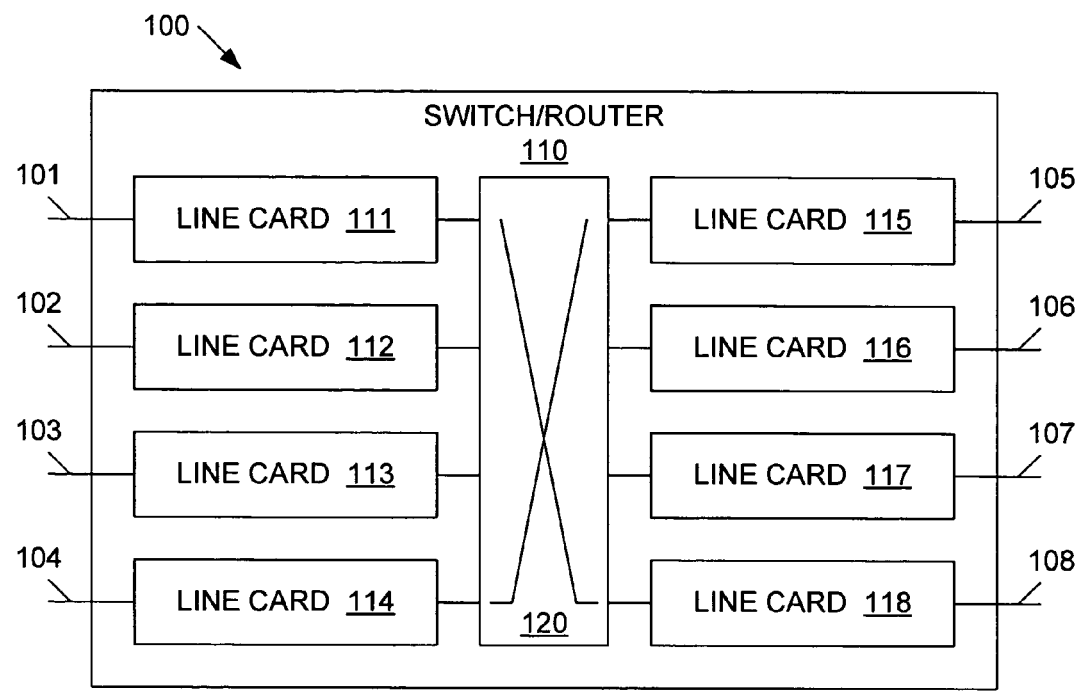
FIG. 1 is a block diagram of a conventional high-level switch/router architecture that includes switch ports and a switch/router.
Figure 2:
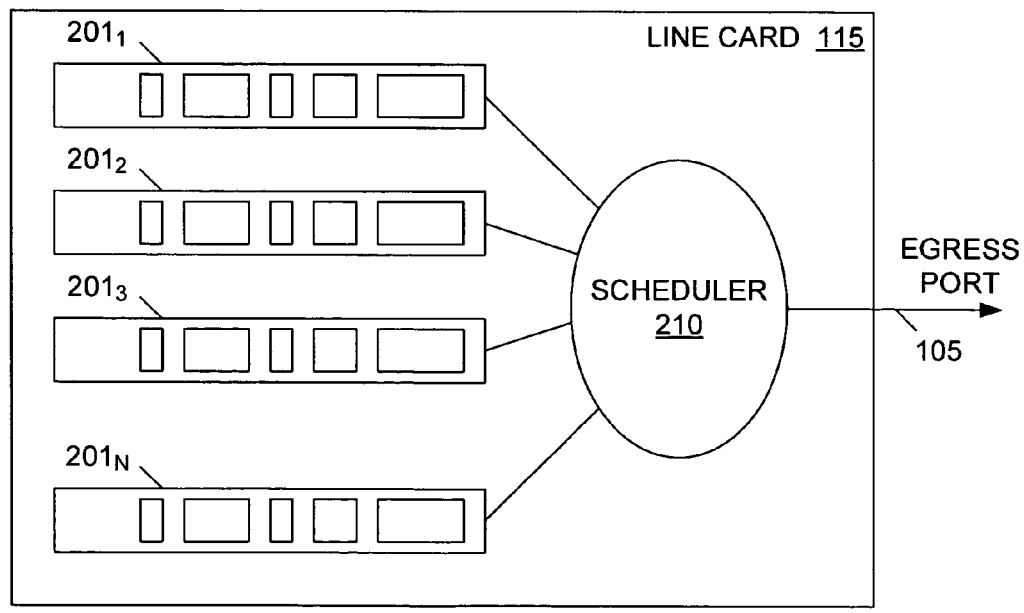
FIG. 2 is a block diagram of a conventional line card, which includes multiple queues for storing data packets received from ingress ports, and a scheduler.

The present invention provides an improved method for implementing weighted round-robin (WRR) scheduling. In accordance with one embodiment of the present invention, a dynamic queue link list is used to implement an improved weighted round-robin scheduling technique.

Before further describing the weighted round-robin (WRR) technique of the present invention, the terms "flow table" and "flow identification" (or FLID), shall be introduced. A flow table contains the parameters necessary for processing received data packets. The flow table entries (e.g., assigned bandwidth) are stored in either an external or internal memory block called the flow table memory. Each flow has a corresponding flow table entry in the flow table memory.

A flow identification (FLID) value is used to identify each individual packet flow. The FLID value is defined as an H-bit field, where H is a given integer. In the described example, H is equal to 32, although this is not necessary. The FLID value is used as a direct or indirect memory address for accessing a flow table entry for a corresponding packet flow. The FLID value can be encoded from the address portion of a received packet, such as the source/destination address in an Internet Protocol (IP) packet or an Ethernet frame. Alternately, the FLID value or a modified (e.g., truncated) version of the FLID value can be appended to the received packet so that a FLID value encoding process is not required.

In accordance with one embodiment of the present invention, the FLID value is used to directly address the flow table. Thus, when a data packet is received from an ingress port, the corresponding FLID value is appended to the beginning of the packet. As described below, the parameters used to process the packet are found in the flow table memory at an address corresponding to the FLID value.

The following example illustrates how the FLID is used. Suppose that a data packet is received from an ingress port.

The FLID is appended to the beginning of the packet (e.g., FLID=J). The information needed to process that packet is found from the flow table memory at the address location "J". The information contained in the flow table includes the address of the flow queue for flow "J" and the flow statistics counters.

N-Cycle Round-Robin Scheduling

In accordance with the present invention, a WRR scheduler uses N cycles, wherein N is a fixed integer. In the described embodiment, N is set equal to 1024 (although this is not necessary). The N cycles are designated as Cycle_1, Cycle_2, ..., Cycle_N. The flow queues are assigned to different cycles. Depending on the weight of a flow queue, a flow queue can appear on multiple cycles. The scheduler circularly visits all the flow queues on Cycle_1, and then all of the flow queues on Cycle_2 through Cycle_N. After the scheduler reaches Cycle_N, the scheduler returns to Cycle_1 and starts over again. The whole process repeats until there are no packets in any of the queues. During each cycle, the WRR scheduler services all of the flow queues assigned to that cycle before continuing on to another cycle.

Weighting and Dynamic Cycle Link List Assignment

Unlike other weighted round-robin implementations, the present invention assigns a weight for each flow that is equal to the inverse of the period (in cycles) at which the flow is visited by the WRR scheduler. Thus, if a flow is to be visited by the WRR scheduler once during each period of "WRR_CYC" cycles, then this flow is assigned a weight equal to 1/WRR_CYC.

For example, if a flow is to be visited by the WRR scheduler at a period equal to 3 cycles/visit (WRR_CYC=3), then this flow is assigned a weight equal to 1/3. In this case, the WRR scheduler will visit this flow during cycles 1, 1+3, 1+(3×2), 1+(3×3), ..., 1+(3×341) (i.e., during cycles 1, 4, 7, 10, ..., 1024). That is, the WRR scheduler will visit this flow once every three cycles.

The minimum weight for a flow is 1/N (e.g., WRR_CYC=N). In the present example, where N is equal to 1024, the minimum weight for a flow is therefore 1/1024. In this case, the flow is visited by the WRR scheduler once every 1024 cycles. For example, the WRR scheduler may visit this flow during cycle 1 only.

The maximum weight for a flow is 1 (e.g., WRR_CYC=1). In this case, the flow is visited by the WRR scheduler during each of the 1024 cycles.

As described in more detail below, each flow is allowed to send a selected number of packets to the egress port during each visit from the WRR scheduler, thereby further controlling the weight of each flow.

Cycle Link Lists

Flow queues assigned to each cycle are organized in a link list, called a cycle link list. In the present invention, a total of N cycle link lists are used, one for each of the N cycles. The cycle link lists are identified as follows: $Link\_List_1$, $Link\_List_2$, ..., $Link\_List_N$. $Link\_List_K$ is the cycle link list of all the flow queues that will be visited by the scheduler in the $K^{th}$ cycle (K=1, 2, ..., N). However, there is no fixed binding between the flow queues and the cycle link lists. Flow queues join the cycle link lists according to when the flow queues become non-empty and according to the provisioned weights of the flow queues. As flow queues on a cycle link list are serviced (when a queued packet is retrieved from memory) the flow queue leaves that cycle link list and joins a new cycle link list that is calculated from the weight of the flow queue.

For example, suppose that a flow queue is currently in cycle K, and its weight is W=1/WRR_CYC. After the flow queue has been visited by the scheduler, this flow queue is removed from the cycle link list, $Link\_List_K$. Based on the weight of the flow queue, this flow is to be visited again in "WRR_CYC" more cycles. Therefore, the flow queue is added to the end of the cycle link list for cycle K+WRR_CYC, (i.e., $Link\_List_{K+WRR\_CYC}$).

Because the maximum cycle number is N, the next cycle number for each flow queue is given by the following equation (assuming that the flow queue is currently in cycle K and the weight of the flow queue is W).

$$C_{NEW} = (K+1/W) MOD(N) \tag{1}$$

Note that "MOD" is the standard mathematical modulo operation. For example, (4)mod(3)=1, and (8)mod(3)=2. Equation (1) can be re-written as follows, assuming that W=1/WRR_CYC, as described above.

$$C_{NEW} = (K+WRR\_CYC) MOD(N) \tag{2}$$

Round-Robin (RR) Table

Figures 3, 4, 5, 6:
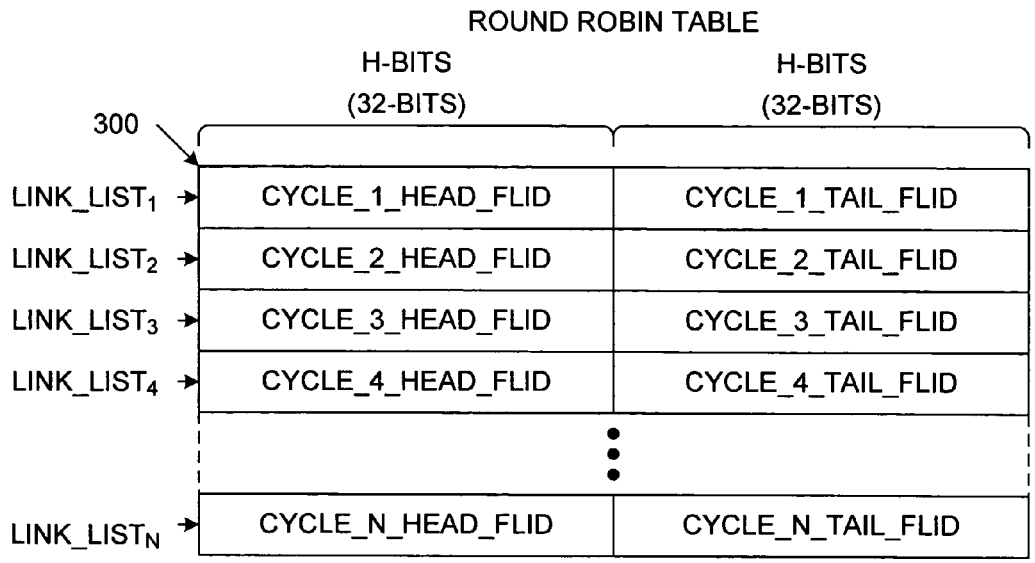
FIG. 3 is a block diagram illustrating a round-robin table that defines a plurality of cycle link lists in accordance with one embodiment of the present invention.
FIG. 4 is a block diagram of a flow table entry in accordance with one embodiment of the present invention.
FIG. 5 is a block diagram illustrating a packet queue entry, which includes a pre-pended header and a packet in accordance with one embodiment of the present invention.
FIG. 6 is a block diagram of an idle cycle register in accordance with one embodiment of the present invention.

FIG. 3 is a block diagram illustrating a round-robin table 300 that defines the N cycle link lists (i.e., $Link\_List_1$, $Link\_List_2$, $Link\_List_3$, $Link\_List_4$, ... $Link\_List_N$) More specifically, round-robin table 300 stores the head and tail flow identification (FLID) values for each of the N cycle link lists. Thus, each cycle link list, $Link\_List_K$, is defined by a first flow added to the cycle link list (identified by the FLID value=Cycle_K_Head_FLID), and a last flow added to the cycle link list (identified by the FLID value=Cycle_K_Tail_FLID). Flows added to the cycle link list, $Link\_List_K$, between the first flow and the last flow are identified by flow table entries in the manner described below.

Round-robin table 300 can be implemented by either external or internal memory.

Flow Table

FIG. 4 is a block diagram of a flow table entry 400 in accordance with one embodiment of the present invention. Each flow has a corresponding flow table entry identical to flow table entry 400. As described in more detail below, each flow table entry has an associated packet queue, which stores the packets associated with the flow. Flow table entry 400 includes pointers to this associated packet queue. These pointers include the address of the first packet in the packet queue (FlowQ_Head_Addr), and the address of the last packet in the packet queue (FlowQ_Tail_Addr).

Flow table entry 400 also includes a pointer (Next_FLID_in_Cyc) to the next flow to be processed in the same cycle. Thus, this pointer (Next_FLID_in_Cyc) is used to link successive flows in the cycle link list.

Flow table entry 400 also stores parameters associated with the weighted round-robin method, including the weighted round-robin cycle value (WRR_CYC), a weighted round-robin burst value (WRR_BURST), a weighted round-robin opportunity value (WRR_OPP) and a packet count value (PKT_CNT). As described above, the weight of the flow associated with flow table entry 400 is defined as 1/WRR_CYC. WRR_BURST is a parameter that is assigned to each flow to indicate how many packets are allowed to be sent each time that the flow queue is visited by the WRR scheduler. WRR_OPP is a running counter used to keep track of the number of packets that have been forwarded during the current cycle.

The WRR_BURST and WRR_OPP parameters are used in the following manner. Initially, WRR_OPP is set equal to WRR_BURST. When the WRR scheduler is visiting the flow queue, WRR_OPP is decremented by one after a packet is forwarded. When WRR_OPP reaches zero, the flow queue has forwarded WRR_BURST packets to the egress port, and the flow queue has received the required bandwidth in the current cycle. WRR_OPP is then reset to be equal to WRR_BURST, and the flow queue is removed from the current link list.

The PKT_CNT parameter records the number of packets in the queue. If PKT_CNT is equal to zero, then there is no packet in the flow queue, or in other words, the flow queue is empty. It is possible that PCK_CNT becomes zero while WRR_OPP is greater than zero. This means that the flow queue would have been allowed to send more packets, but does not because the flow queue has no more packets to send. In this case, the flow queue should be treated as if it has already forwarded WRR_BURST packets (i.e., WRR_OPP is set equal to WRR_BURST, and the flow queue is removed from the current link list).

Flow table entry 400 is also capable of storing other parameters related to processing of the packet queue.

Packet Header for Cycle Link Lists and Flow Queues

To support the cycle link lists, the flow tables and the packet queues, a header is pre-pended to the beginning of each received packet. Alternately, a post-pended trailer can be used in place of the pre-pended header. The pre-pended header and the associated packet can be stored in different physical memory devices. For example, the pre-pended header can be stored in an external SRAM, and the packet can be stored in an external SDRAM. In another embodiment, both the pre-pended header and the associated packet can be stored in the same physical memory device.

FIG. 5 is a block diagram illustrating a packet queue entry 500, which includes pre-pended header 501 and packet 502. Pre-pended header 501 includes a packet queue pointer (Next_Pkt_Addr) that identifies the address of the next packet in the packet queue.

When the packet queue entry 500 is processed, pre-pended header 501 is stripped off, and only the packet 502 is sent to the egress port. As described above, packet 502 includes the FLID value that identifies the corresponding flow. Pre-pended header 501 may also contain other information not directly related to the WRR scheduling scheme of the present invention.

Idle Cycle Register

FIG. 6 is a block diagram of an idle cycle register 600 in accordance with one embodiment of the present invention. Idle cycle register 600 includes N entries, wherein each entry corresponds with one of the N Cycle Link Lists. Each entry of idle cycle register 600 stores a 1-bit idle cycle indicator, Cycle_K, that indicates the status of the corresponding Cycle Link List, Link_List$_K$. For example, if the 1-bit idle cycle indicator, Cycle_K, has a logic "1" value, then the corresponding cycle link list, Link_List$_K$, is idle, and does not require processing. Conversely, if the 1-bit idle cycle indicator, Cycle_K, has a logic "0" value, then the corresponding cycle link list, Link_List$_K$, is active, and should be processed.

The WRR scheduler of the present invention only processes the active cycle link lists (i.e., the cycle link lists having a corresponding "0" value in idle cycle register 600). By skipping the idle cycle link lists, processing speed is improved.

After the last packet from an active cycle link list has been sent to the egress port, the current cycle link list becomes idle, and the WRR scheduler continues processing with the next non-idle cycle link list. For example, if the WRR scheduler is currently processing Link_List$_K$, and the last packet has been sent from this cycle link list (i.e., the last packet from the flow identified by the Cycle_K_Tail_FLID), then the corresponding entry of idle cycle register 600 (i.e., Cycle_K) is set to a logic "1" value, thereby rendering Link_List$_K$ idle. The WRR scheduler then begins processing the next non-idle cycle link list identified by idle cycle register 600 (i.e., the cycle link list having the next "0" entry in idle cycle register 600).

Idle cycle register 600 may be implemented externally or internally. However, an internal implementation is preferable to provide for faster access.

Per-Flow Packet Queue

The packet queue for a single flow having a FLID value equal to "H" will now be described. FIGS. 7A-7E are block diagrams illustrating the flow table entry 701 for the flow having a FLID value equal to "H" and the corresponding packet queue. Flow table entry 701 is stored at address "H" of a flow table memory in accordance with the described embodiment. The "other parameters" field of flow table entry 701 is not shown for purposes of clarity. In the described example, WRR_CYC=4 and WRR_BURST=2. WRR_OPP is initially set equal to WRR_BURST.

Figure 7A:
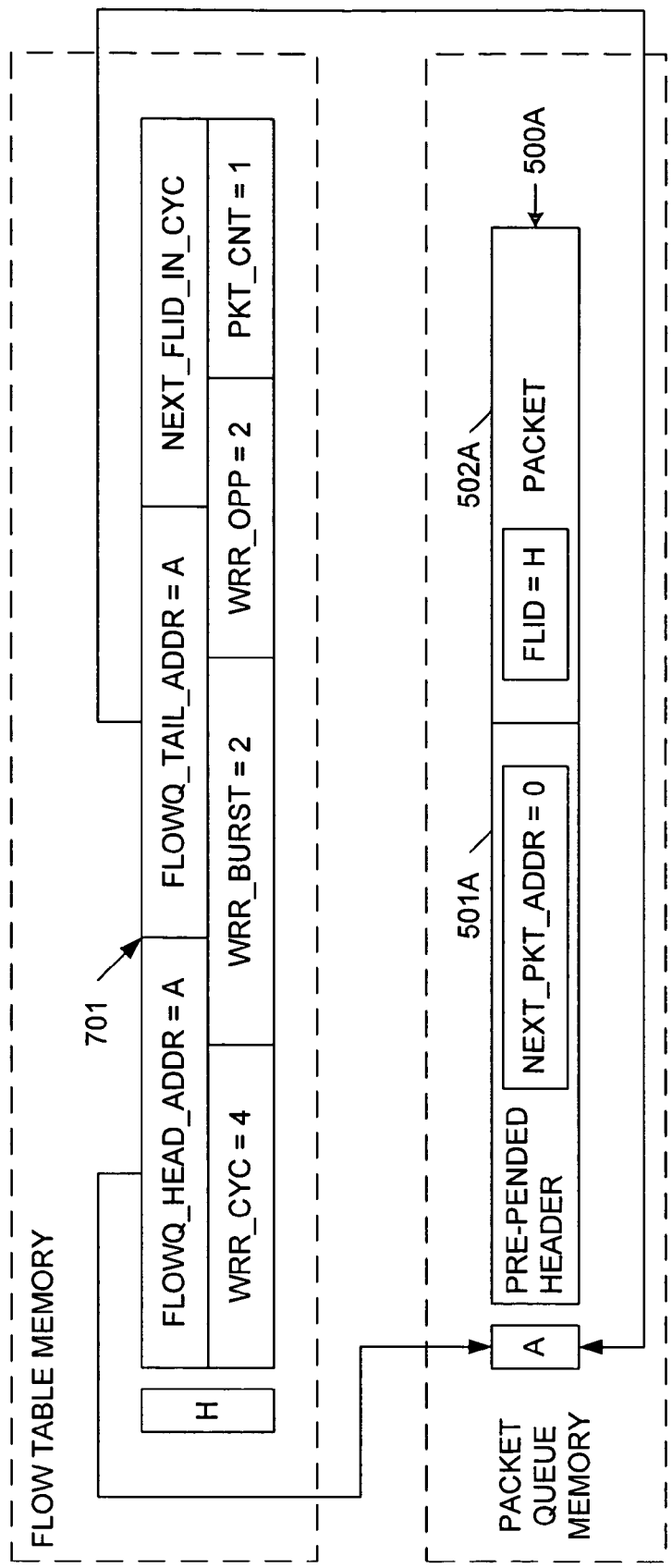
FIGS. 7A-7E are block diagrams illustrating a flow table entry for a flow having a FLID value equal to "H" and the corresponding packet queue in accordance with one embodiment of the present invention.

As illustrated in FIG. 7A, a first packet queue entry 500A is initially added to the packet queue associated with FLID value "H". The first packet queue entry 500A is stored at address "A" of the packet queue memory. This first packet queue entry 500A includes pre-pended header 501A and packet 502A. The FlowQ_Head_Addr pointer of flow table entry 701 is set to a value of "A", thereby properly identifying packet queue entry 500A as the first entry in the packet queue. The FlowQ_Tail_Addr pointer of flow table entry 701 is also set to a value of "A", thereby properly identifying packet queue entry 500A as the last (i.e., only) entry in the packet queue. Because there is only one entry 500A in the packet queue, the Next_Pkt_Addr parameter of pre-pended header 501A is initially a null value. The Pkt_Cnt value is incremented to a value of "1", thereby indicating that the packet queue stores one entry.

The cycle in which the first packet queue entry 500A is to be sent to the egress port (i.e., $C_{NEW}$) is calculated in accordance with Equation (1). In the described example, $C_{NEW}$ is equal to "K". The flow table entry 701 is then added to the tail of the cycle link list associated with this cycle $C_{NEW}$, Link_List$_K$. The first packet queue entry 500A is subsequently dequeued during the calculated cycle, "K". Note that up to WRR_BURST (e.g., 2) packets can be dequeued during this cycle "K".

However, in the present example, two more packet queue entries (500B and 500C) are received before the calculated cycle K.

Figure 7B:
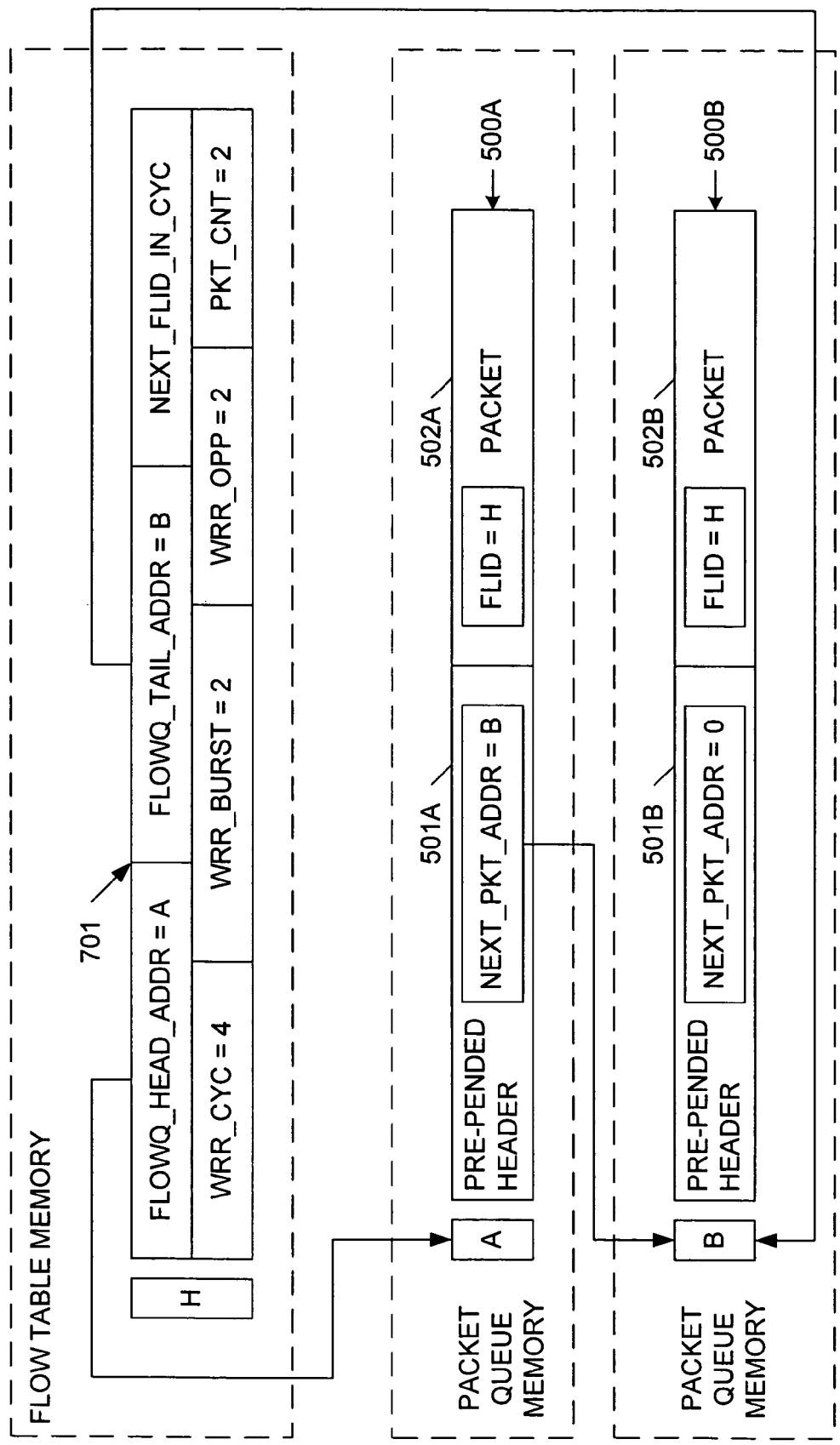

As illustrated in FIG. 7B, a second packet queue entry 500B is subsequently added to the packet queue associated with FLID value "H". The second packet queue entry 500B is stored at address "B" of the packet queue memory. This second packet queue entry 500B includes pre-pended header 501B and packet 502B. The FlowQ_Head_Addr pointer of flow table entry 701 remains set to a value of "A". However, the FlowQ_Tail_Addr pointer of flow table entry 701 is set to a value of "B", thereby properly identifying packet queue entry 500B as the last (and most recent) entry in the packet queue. The Next_Pkt_Addr parameter of pre-pended header 501A is set to a value of "B", thereby properly identifying packet queue entry 500B as the second entry in the packet queue. Because packet queue entry 500B is the last entry in the packet queue, the Next_Pkt_Addr parameter of pre-pended header 501B is set to a null value. The Pkt_Cnt value is incremented to a value of "2", thereby indicating that the packet queue stores two entries.

Figure 7C:
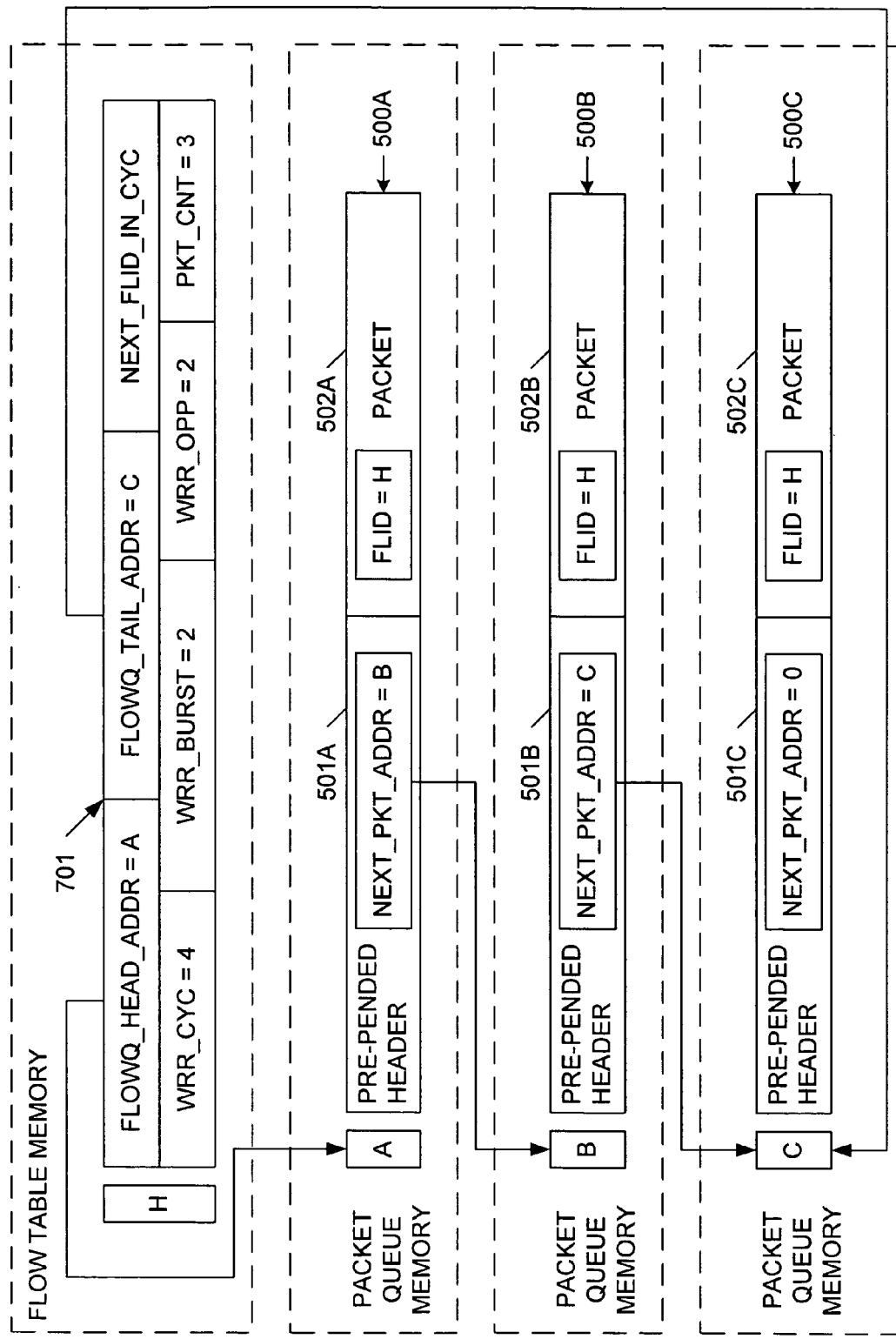

As illustrated in FIG. 7C, a third packet queue entry 500C is subsequently added to the packet queue associated with FLID value "H". The third packet queue entry 500C is stored at address "C" of the packet queue memory. This third packet queue entry 500C includes pre-pended header 501C and packet 502C. The FlowQ_Head_Addr pointer of flow table entry 701 remains set to a value of "A". However, the FlowQ_Tail_Addr pointer of flow table entry 701 is set to a value of "C", thereby properly identifying packet queue entry 500C as the last (and most recent) entry in the packet queue. The Next_Pkt_Addr parameter of pre-pended header 501B is set to a value of "C", thereby properly identifying packet queue entry 500C as the third entry in the packet queue. Because packet queue entry 500C is the last entry in the packet queue, the Next_Pkt_Addr parameter of pre-pended header 501C are set to a null value. The Pkt_Cnt value is incremented to a value of "3", thereby indicating that the packet queue stores three entries.

Figure 7D:
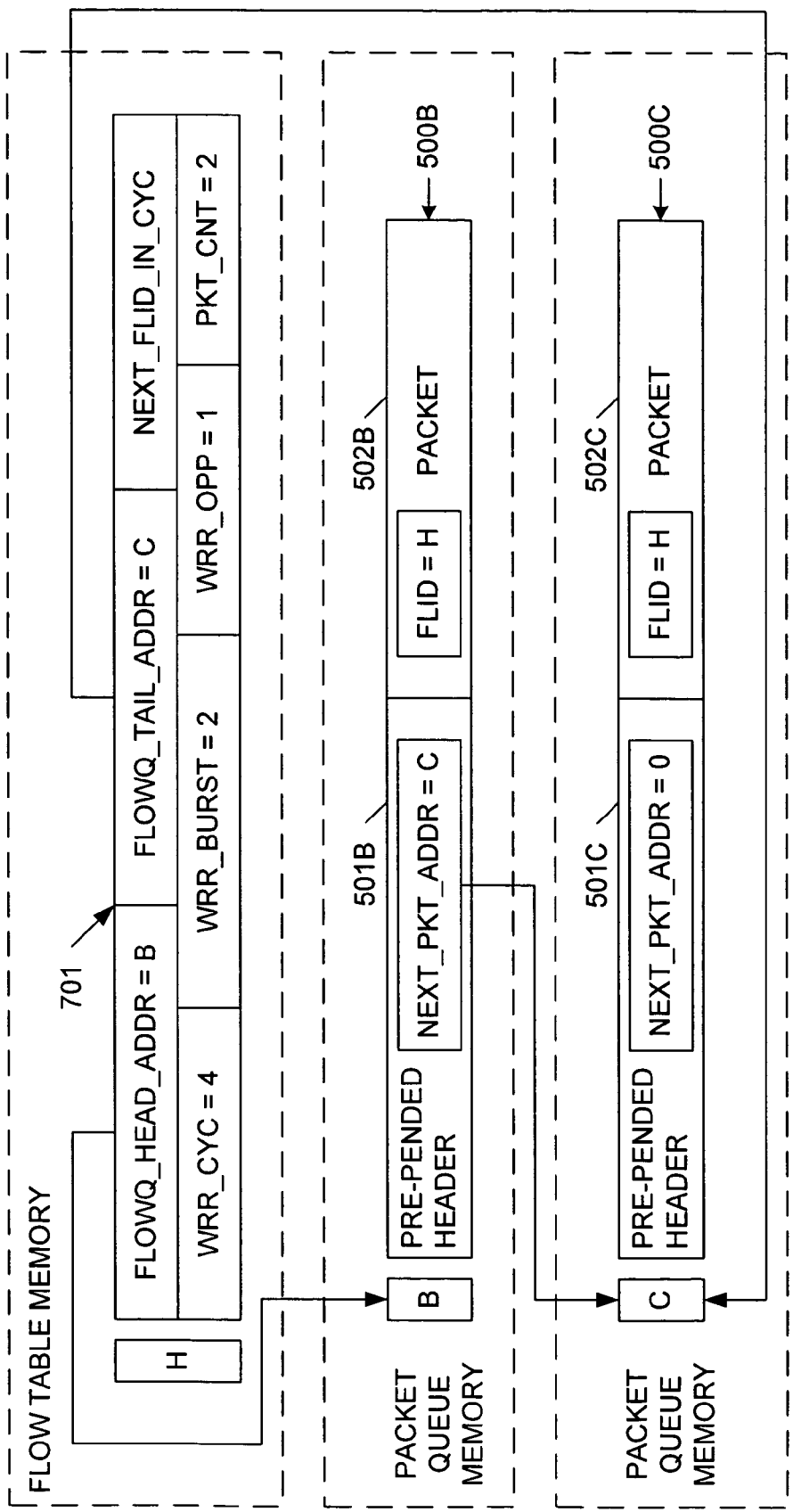

As illustrated in FIG. 7D, the WRR scheduler then processes the cycle link list (Link_List$_K$) associated with the above-calculated cycle, "K". At this time, the first and second packet queue entries 500A and 500B are dequeued (i.e., sent to the egress port). The dequeue process is implemented as follows.

The FlowQ_Head_Addr pointer is used to read the first packet queue entry 500A from address "A" of the packet queue memory. The WRR scheduler strips off pre-pended header 501A, and sends packet 502A to the egress port. The Next_Pkt_Addr value of pre-pended header 501A (i.e., "B"), is written to the FlowQ_Head_Addr pointer, thereby causing the second packet queue entry 500B to become the head packet queue entry. The Pkt_Cnt parameter of flow table entry 701 is decremented by one to a value of "2", thereby indicating that there are now two entries in the packet queue. The WRR_OPP parameter of flow table entry 701 is also decremented by one to a value of "1", thereby indicating that one more packet can be dequeued from the flow during the present cycle K.

Figure 7E:
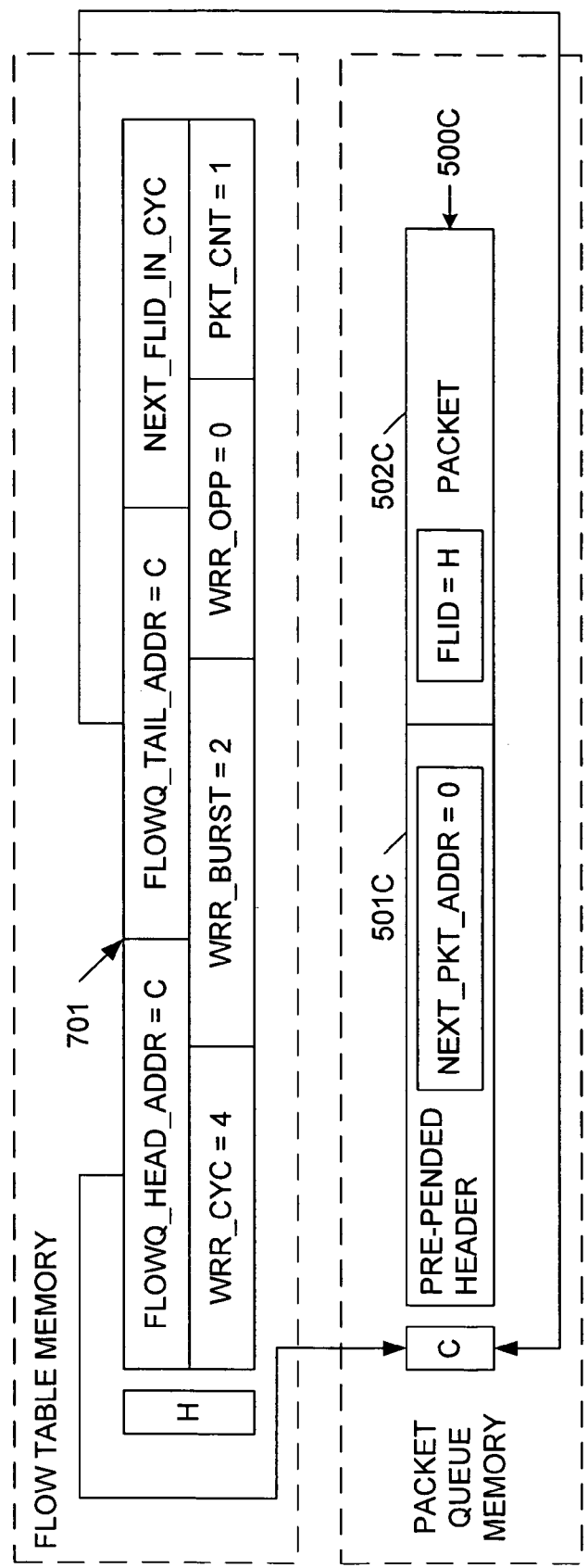

As illustrated in FIG. 7E, the FlowQ_Head_Addr pointer is used to read the first packet queue entry 500A from address "B" of the packet queue memory. The WRR scheduler strips off pre-pended header 501B, and sends packet 502B to the egress port. The Next_Pkt_Addr value of pre-pended header 501B (i.e., "C"), is written to the FlowQ_Head_Addr pointer, thereby causing the third packet queue entry 500C to become the head packet queue entry. The Pkt_Cnt parameter of flow table entry 701 is decremented by one to a value of "1", thereby indicating that there is now one entry in the packet queue. The WRR_OPP parameter of flow table entry 701 is also decremented by one to a value of "0", thereby indicating that no more packets can be dequeued from the flow during the present cycle K.

The cycle in which the next packet queue entry 500C is to be sent to the egress port (i.e., $C_{NEW}$) is then calculated in accordance with Equation (2). In the described example, $C_{NEW}$ is equal to K+WRR_CYC, or K+4. The flow table entry 701 is then added to the tail of the cycle link list associated with this cycle, "K+4" (i.e., Link_List$_{K+4}$). The packet queue entry 500C is subsequently dequeued during the newly calculated cycle, "K+4".

In the above-described manner, the three pointers, FlowQ_Head_Addr, FlowQ_Tail_Addr and Next_Pkt_Addr, are used to link all packets of the same flow.

Having described the flow table entries and the corresponding packet queues, the cycle link lists will now be described in more detail.

Cycle Link Lists

Figure 8A:
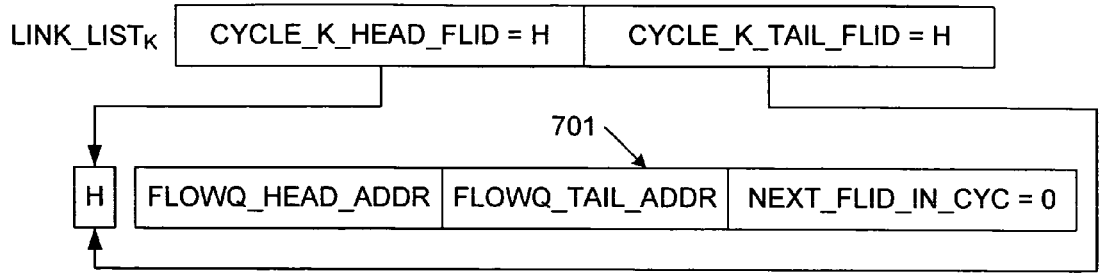
FIGS. 8A-8F are block diagrams illustrating the dequeuing of a cycle link list of the round-robin table of FIG. 3 in accordance with one embodiment of the present invention.

FIG. 8A is a block diagram of a cycle link list Link_List$_K$ of round-robin table 300 in accordance with the present example. As described above, the WRR scheduler determines that packet queue entries of the flow having a FLID value of "H" are to be dequeued during cycle "K". Thus, the flow table entry 701 of the flow having a FLID "H" must be linked to cycle "K". To accomplish this, the WRR scheduler causes the address of flow table entry 701 (i.e., "H") to be written to the head FLID pointer (Cycle_K_Head_FLID) and the tail FLID pointer (Cycle_K_Head_FLID) of Link_List$_K$. In the present example, it is assumed that FLID "H" is the first flow added to Link_List$_K$. As a result, the Next_FLID_in_Cyc pointer of flow table entry 701 is initially written with a null value. Note that the packet queue entries 500A-500C associated with flow table entry 701 are not illustrated in FIG. 8A for purposes of clarity.

Figure 8B:
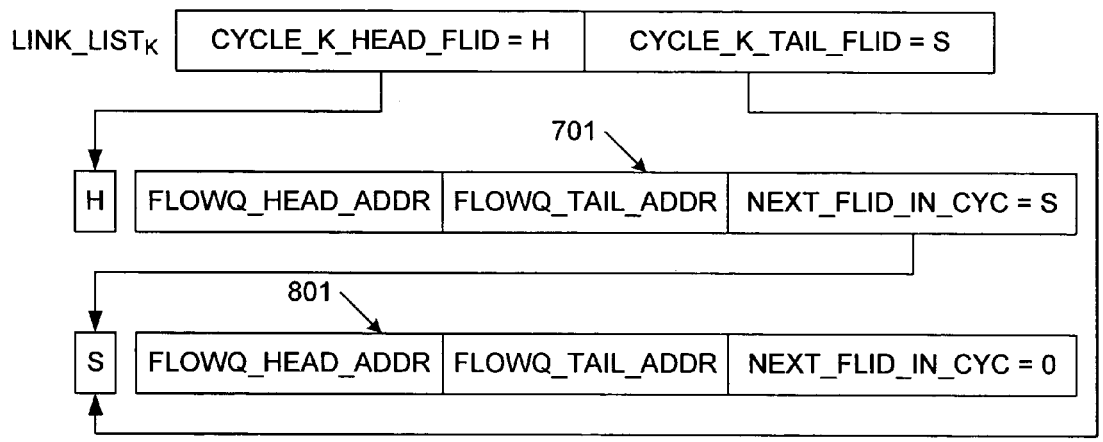

As illustrated in FIG. 8B, the WRR scheduler determines that the flow having a FLID value of "S" also includes one or more packet queue entries to be dequeued during cycle "K". Thus, the flow table entry 801 of this flow must be linked to the tail of Link_List$_K$. To accomplish this, the WRR scheduler causes the address of flow table entry 801 (i.e., "S") to be written to the tail FLID pointer (Cycle_K_Head_FLID) of Link_List$_K$. At this time, the WRR scheduler also writes the address "S" to the Next_FLID_in_Cyc pointer of flow table entry 701, thereby linking the flows identified by FLID values "H" and "S". The Next_FLID_in_Cyc pointer of flow table entry 801 is initially written with a null value. Note that the packet queue entries associated with flow table entry 801 are not illustrated in FIG. 8B for purposes of clarity.

Figure 8C:
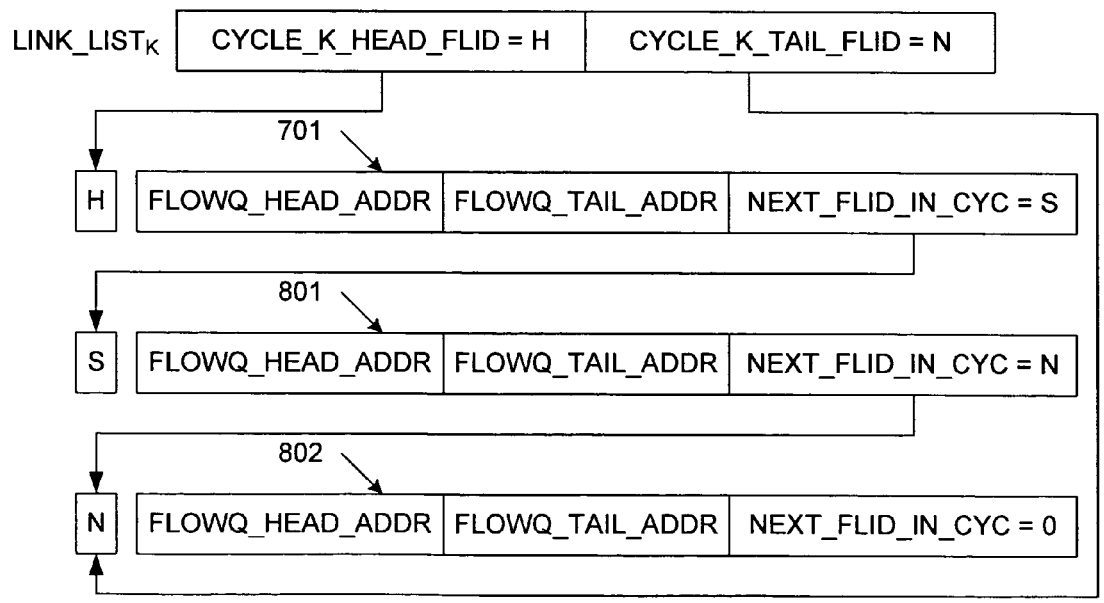

As illustrated in FIG. 8C, the WRR scheduler determines that the flow having a FLID value of "N" also includes one or more packet queue entries to be dequeued during cycle "K". Thus, the flow table entry 802 of this flow must be linked to the tail of Link_List$_K$. To accomplish this, the WRR scheduler causes the address of flow table entry 802 (i.e., "N") to be written to the tail FLID pointer (Cycle_K_Tail_FLID) of Link_List$_K$. At this time, the WRR scheduler also writes the address "N" to the Next_FLID_in_Cyc pointer of flow table entry 801, thereby linking the flows identified by FLID values "S" and "N". The Next_FLID_in_Cyc pointer of flow table entry 802 is initially written with a null value. Note that the packet queue entries associated with flow table entry 802 are not illustrated in FIG. 8C for purposes of clarity.

The WRR scheduler subsequently processes Link_List$_K$ in the following manner. The WRR scheduler initially processes the flow table entry identified by the Cycle_K_Head_FLID of Link_List$_K$. In the present example, the Cycle_K_Head_FLID identifies flow table entry 701 at address "H". Thus, the WRR scheduler dequeues the first and second packet queue entries 500A and 500B associated with flow table entry 701 in the manner described above. As described above, the WRR scheduler determines that second packet queue entry 500B associated with flow table entry 701 is to be dequeued during cycle K+4. This cycle K+4 is designated cycle "J" in the described example. Thus, flow table entry 701 is added to the tail of Link_List$_J$ in the manner illustrated by FIGS. 8A-8C. In the described example, flow table entry 701 is the first flow table entry to Link_List$_J$, although this is not necessary.

The WRR scheduler also copies the Next_FLID_in_Cyc pointer ("S") read from flow table entry 701 to the Cycle_K_

Head_FLID pointer of Link_List$_K$, thereby indicating that this flow will be dequeued next.

Figure 8D:
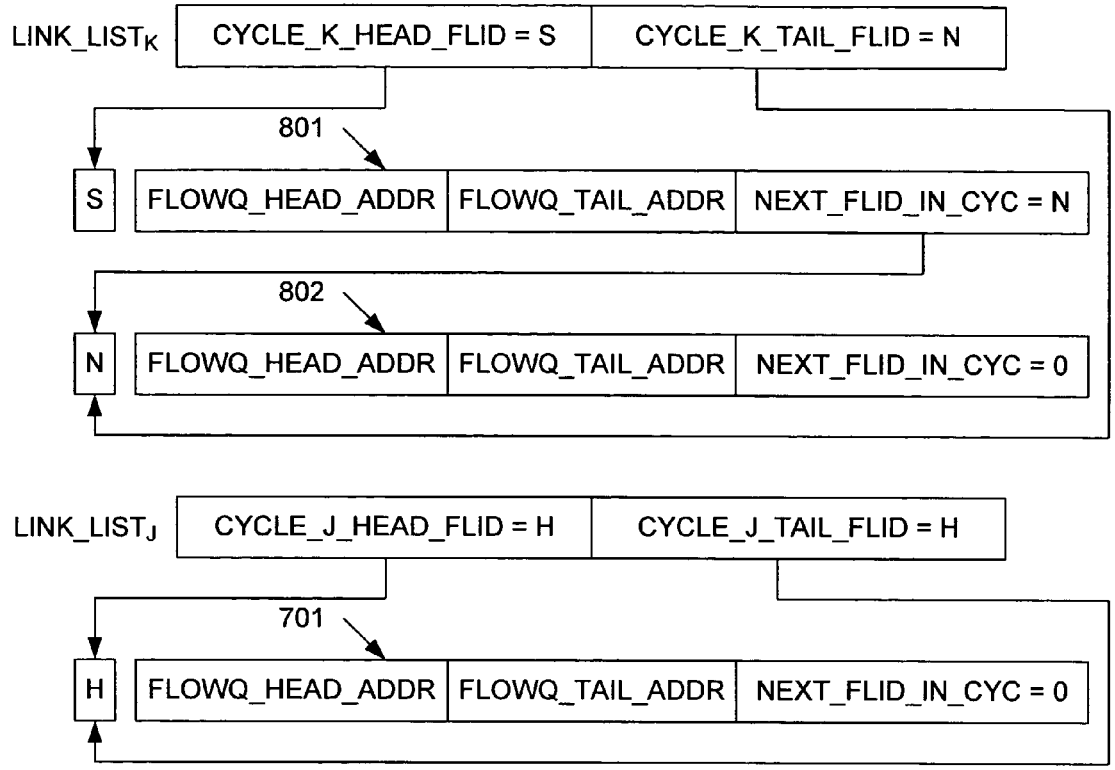

FIG. 8D illustrates Link_List$_K$ and Link_List$_J$ after the first two packet queue entries associated with flow table entry 701 have been dequeued.

Next, the WRR scheduler processes the flow table entry 801 identified by the new Cycle_K_Head_FLID of Link_List$_K$. In the present example, the new Cycle_K_Head_FLID identifies flow table entry 801 at address "S". Thus, the WRR scheduler dequeues the appropriate packet queue entries associated with flow table entry 801 in the manner described above. In the present example, the WRR scheduler determines that there are no more packet queue entries associated with the flow identified by FLID value "S". Thus, flow table entry 801 is not added to the tail of any cycle link list.

The WRR scheduler also copies the Next_FLID_in_Cyc pointer ("N") read from flow table entry 801 to the Cycle_K_Head_FLID pointer of Link_List_K, thereby indicating that this flow will be dequeued next.

Figure 8E:
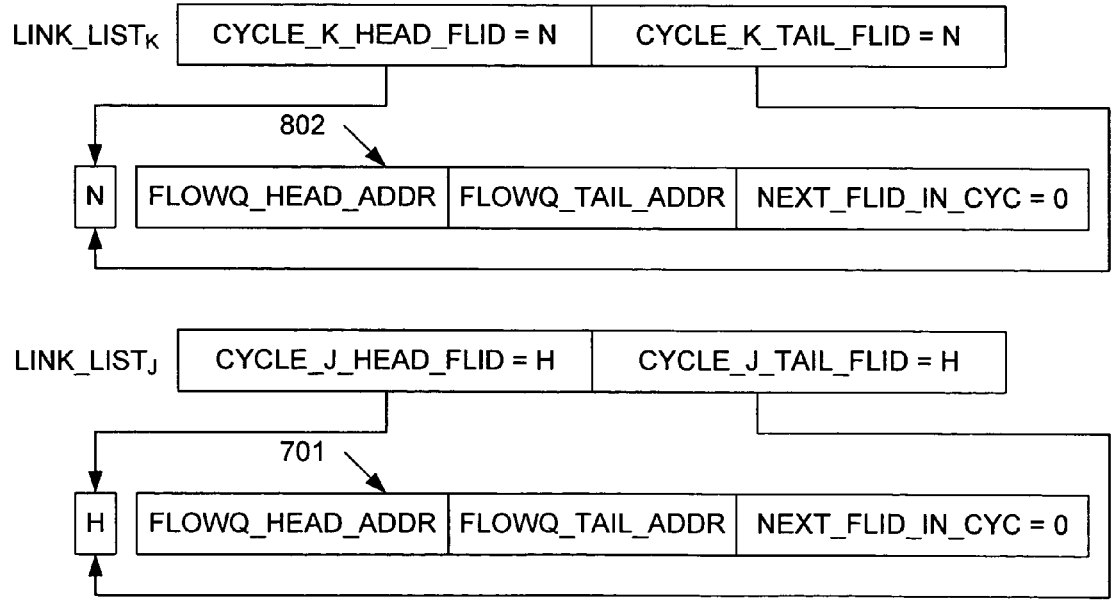

FIG. 8E illustrates Link_List$_K$ and Link_List$_J$ after the packet queue entry associated with flow table entry 801 has been dequeued.

Finally, the WRR scheduler processes the flow table entry 802 identified by the new Cycle_K_Head_FLID of Link_List$_K$. In the present example, the new Cycle_K_Head_FLID identifies flow table entry 802 at address "N". Thus, the WRR scheduler dequeues the appropriate packet queue entries associated with flow table entry 802 in the manner described above. In the present example, the WRR scheduler determines that the remaining (unsent) packet queue entries associated with flow table entry 802 are to be dequeued during cycle "M". Thus, flow table entry 802 is added to the tail of Link_List$_M$ in the manner illustrated by FIGS. 8A-8C. In the described example, flow table entries 811-812 already exist in Link_List$_M$, although this is not necessary.

Because the WRR scheduler has dequeued the last entry of Link_List$_K$, the current cycle "K" becomes idle, and the WRR scheduler begins processing the next non-idle cycle identified by idle cycle register 600. In addition, a logic "1" value is written to the corresponding Cycle_K value in idle cycle register 600, thereby indicating that cycle "K" is idle. Moreover, null values are written to both the Cycle_K_Head_FLID pointer and the Cycle_K_Tail_FLID pointer of Link_List$_K$.

Figure 8F:
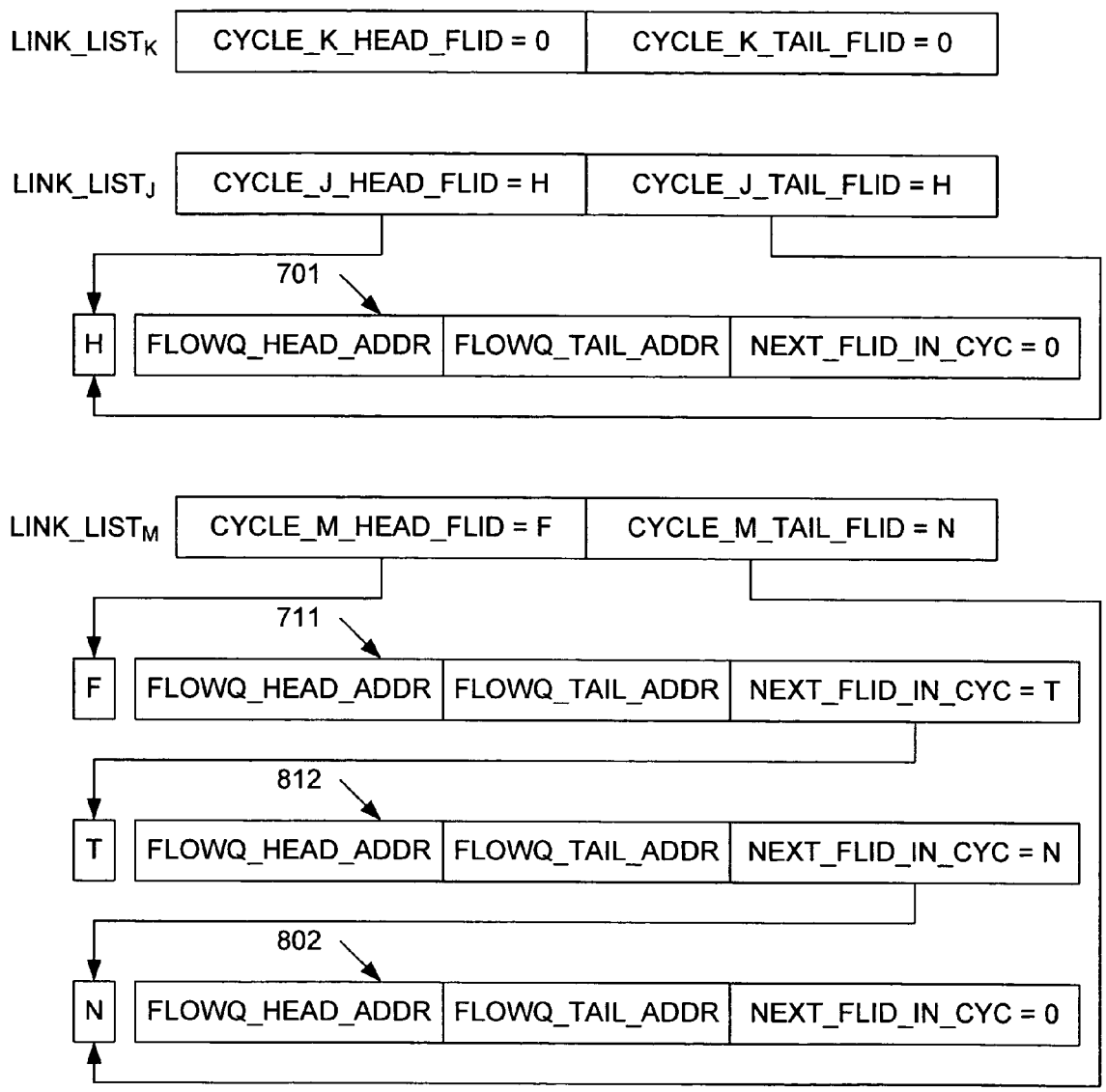

FIG. 8F illustrates Link_List$_K$, Link_List$_J$ and Link_List$_M$ after the packet queue entry associated with flow table entry 802 has been dequeued.

In the foregoing manner, the WRR scheduler uses the three pointers, Cycle_K_Head_FLID, Cycle_K_Tail_FLID and Next_FLID_in_Cyc, to bind the flows of Link_List$_K$ together.

Flow Diagrams Defining the Enqueue Process

Figure 9:
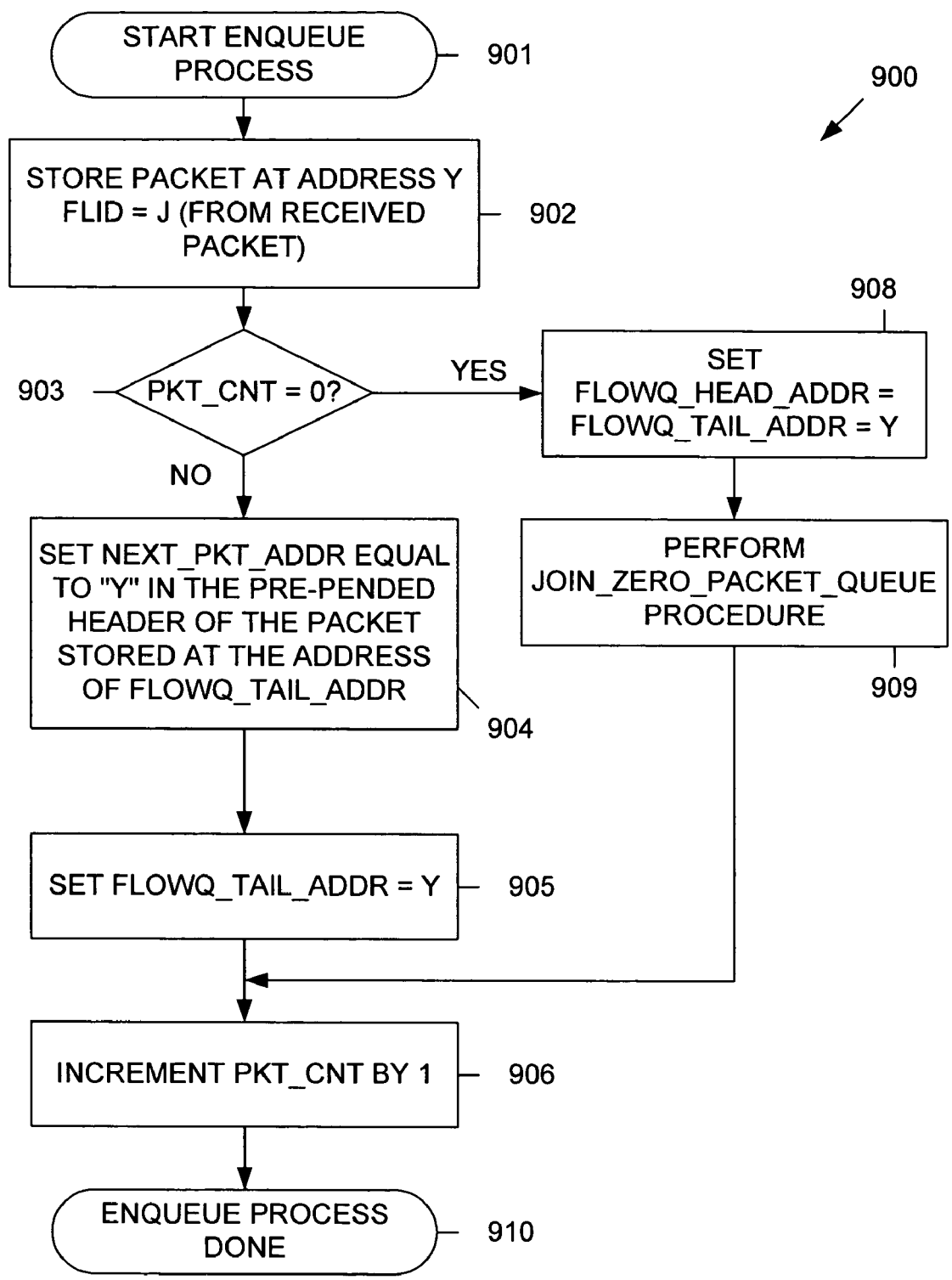
FIG. 9 is a flow diagram summarizing the enqueue process implemented by the WRR scheduler in accordance with one embodiment of the present invention.
Figure 10:
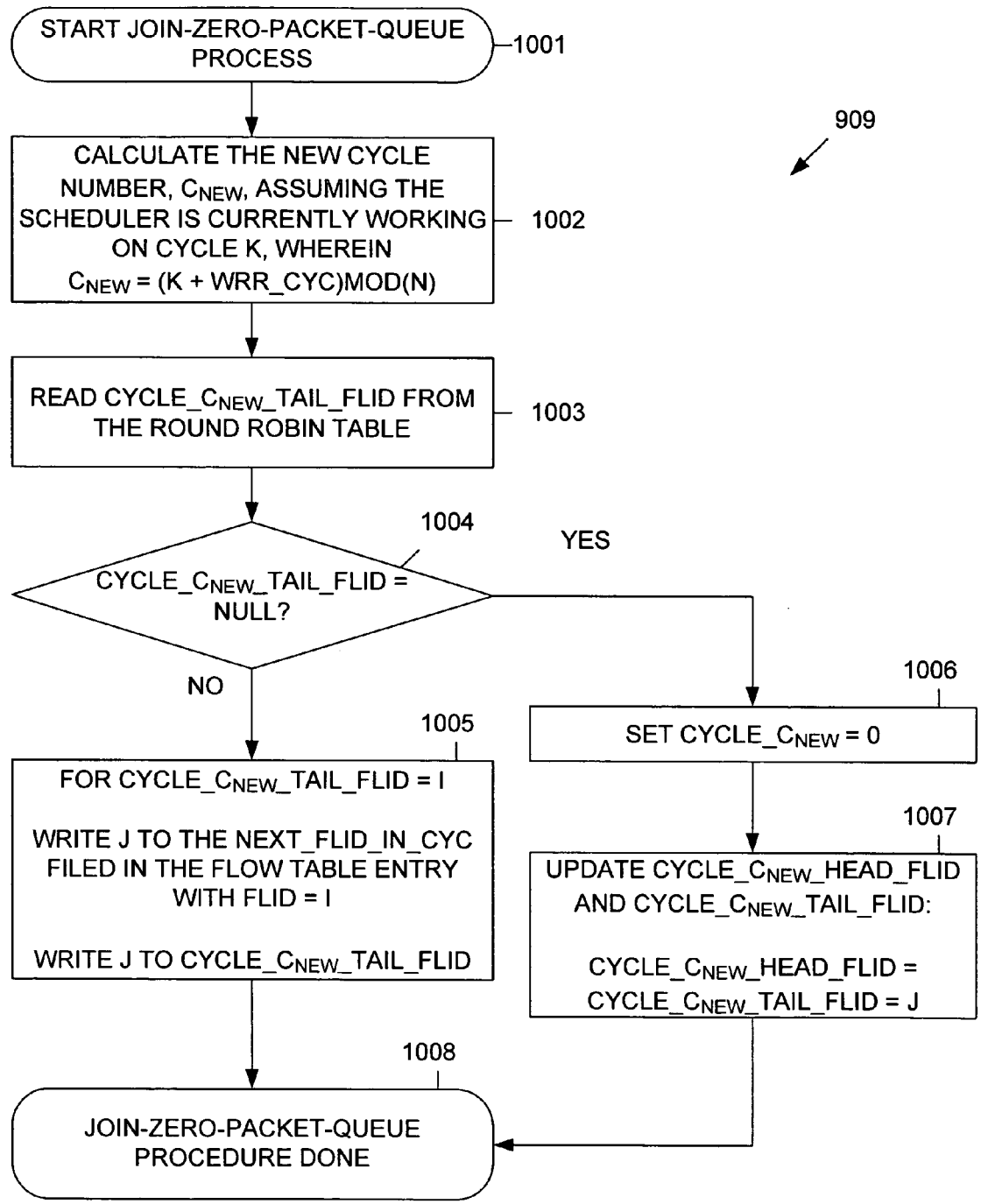
FIG. 10 is a flow diagram illustrating a "Join-Zero-Packet-Queue" procedure of the enqueue process of FIG. 9.

FIG. 9 is a flow diagram 900 summarizing the enqueue process implemented by the WRR scheduler in accordance with one embodiment of the present invention. This enqueue process covers the procedure used when data packets are received from the ingress ports. Flow diagram 900 shows the steps needed for the enqueue process. The "Join-Zero-Packet-Queue" procedure 909 is required when a packet arrives at an empty queue. FIG. 10 is a flow diagram illustrating the "Join-Zero-Packet-Queue" procedure 909.

As illustrated in FIG. 9, when a new data packet is received, the enqueue process starts (Step 901). As described above, the packet includes a corresponding FLID value. The packet is stored in the packet queue associated with a flow table entry having the corresponding FLID value, in the manner described above in FIGS. 7A-7F (Step 902). In the flow diagram of FIG. 9, the address of the packet is designated as address value "Y", and the FLID value is designated as "J" (Step 902).

The WRR scheduler then determines whether the Pkt_Cnt parameter of the flow table entry has a zero value (Step 903). If the Pkt_Cnt parameter is zero, then the current packet represents the first packet of the packet queue. In this case, processing proceeds to Step 908, wherein the FlowQ_Head_Addr and FlowQ_Tail_Addr pointers are set to the packet address value "Y" (see, e.g., FIG. 7A).

Processing then proceeds to join_zero packet_queue procedure (Step 909), which is illustrated in more detail in FIG. 10. Turning now to FIG. 10, the join_zero_packet_queue procedure starts at Step 1001. The WRR scheduler calculates the new cycle number $C_{NEW}$, in the manner described above in accordance with Equation (2) (Step 1002). The new cycle number $C_{NEW}$ is determined with respect to the current cycle K.

The WRR scheduler then reads the Cycle_$C_{NEW}$_Tail_FLID pointer from Link_List$_{CNEW}$ of round-robin table 300 (Step 1003). If the Cycle_$C_{NEW}$_Tail_FLID pointer has a null value (Step 1004, Yes branch), then the current packet is the first packet assigned to cycle $C_{NEW}$. In this case, the WRR scheduler sets the idle cycle indicator Cycle_$C_{NEW}$ to a "0" value, thereby indicating that the cycle $C_{NEW}$ is now active (Step 1006). The WRR scheduler then updates the Cycle_$C_{NEW}$_Head_FLID and Cycle_$C_{NEW}$_Tail_FLID pointers by writing these pointers with the current FLID value "J" (Step 1007). After this, the join_zero_packet_queue procedure is complete (Step 1008), and processing returns to Step 906 (FIG. 9).

Returning now to Step 1004, if the Cycle_$R_{NEW}$_Tail_FLID pointer does not have a null value (Step 1004, No branch), then the current packet is not the first packet assigned to cycle $C_{NEW}$. In this example, the current value of the Cycle_$C_{NEW}$_Tail_FLID pointer is designated by the symbol "I". In this case, the current FLID value "J" is written to the Next_FLID_in_Cyc pointer in the flow table entry having FLID "I" (Step 1005). The current FLID value "J" is also written to the Cycle_$C_{NEW}$_Tail_FLID pointer (Step 1005). After this, the join_zero_packet_queue procedure is complete (Step 1008), and processing returns to Step 906 (FIG. 9).

Returning now to Step 903 of FIG. 9, if the Pkt_Cnt value is not equal to zero (Step 903, No branch), then there is previous packet stored in the packet queue ahead of the current packet. The pre-pended header of this previous packet is written such that the Next_Pkt_Addr is equal to "Y" (Step 904). The FlowQ_Tail_Addr of the corresponding flow table entry is set to a value of "Y", thereby indicating that the current packet has been added to the tail of the packet queue (Step 905).

Processing proceeds from either Step 905 or Step 909 to Step 906, wherein the Pkt_Cnt parameter of the corresponding flow table entry is incremented by one, in order to indicate that another packet has been added to the packet queue. The enqueue process is then complete (Step 910).

Flow Diagrams Defining the Dequeue Process

Figure 11:
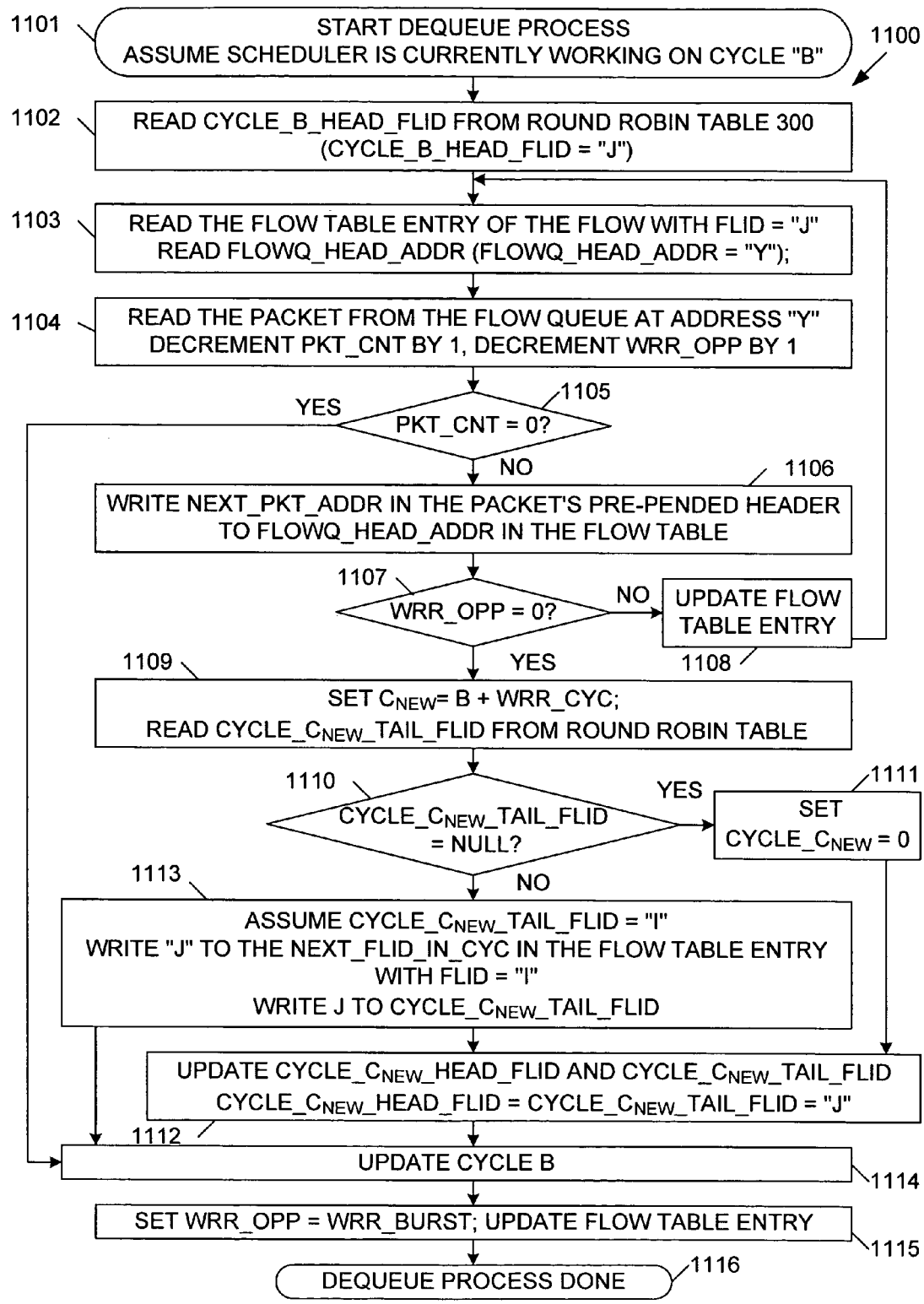
FIG. 11 is a flow diagram summarizing the dequeue process implemented by the WRR scheduler in accordance with one embodiment of the present invention.
Figure 12:
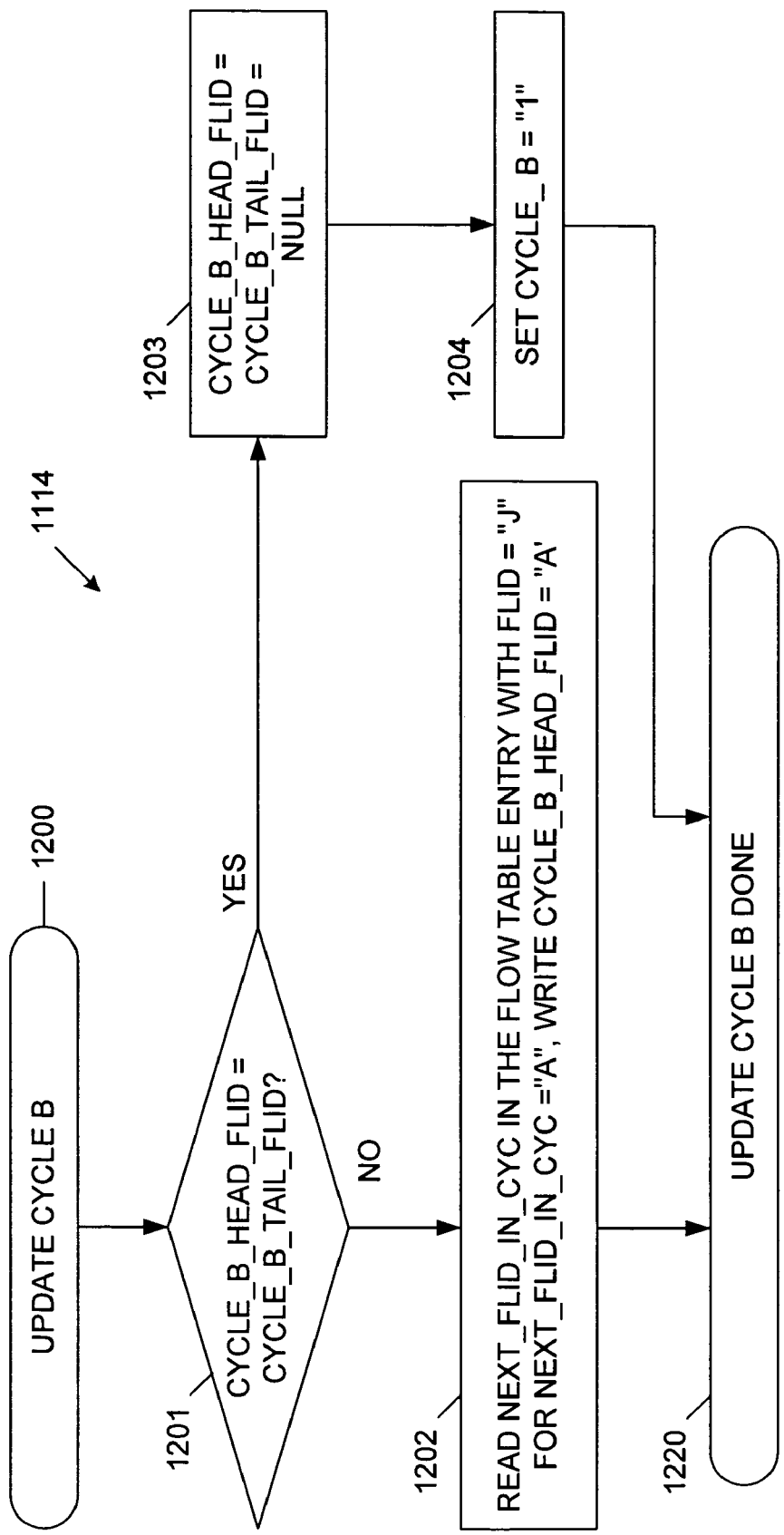
FIG. 12 is a flow diagram illustrating an "Update Cycle B" procedure of the dequeue process of FIG. 11.

FIG. 11 is a flow diagram 1100 summarizing the dequeue process implemented by the WRR scheduler in accordance with one embodiment of the present invention. This dequeue process covers the procedure used when data packets are sent to the egress port. Flow diagram 1100 shows the steps needed for the dequeue process. The "Update Cycle B" procedure 1114 is required at the end of each dequeue process. FIG. 12 is a flow diagram illustrating the "Update Cycle B" procedure 1114.

As illustrated in FIG. 11, when the WRR scheduler starts the dequeue process (Step 1101), the WRR scheduler is currently working on a cycle, which is designated as Cycle "B". The WRR scheduler reads the Cycle_B_Head_FLID from the round-robin table 300 (Step 1102). The Cycle_B_Head_FLID read in this manner is designated as FLID "J". The WRR scheduler then reads the FlowQ_Head_Addr from the flow table entry of the flow with FLID="J". (Step 1103). The FlowQ_Head_Addr from this flow table entry is designated as "Y".

The WRR scheduler then reads the packet from the flow queue at address "Y", decrements PKT_CNT of the flow table entry by one, and decrements the WRR_OPP value of the flow table entry by one (Step 1104).

The WRR scheduler then determines whether the Pkt_Cnt of the flow table entry has a value of zero (Step 1105). If the Pkt_Cnt has a value of zero, then the packet queue associated with the flow table entry is empty (Step 1105, Yes branch). In response, processing proceeds to "Update Cycle B" process (Step 1114).

If the WRR scheduler determines the Pkt_Cnt has a non-zero value, then the packet queue associated with the flow table entry is not empty (Step 1105, No branch). In this case, the WRR scheduler copies the Next_Pkt_Addr from the packet stored at address "Y" to the FlowQ_Head_Addr of the flow table entry (Step 1106).

The WRR scheduler then determines whether the WRR_OPP value is equal to zero (Step 1107). If not (Step 1107, No branch), then the WRR scheduler updates the flow table entry (Step 1108), and returns to Step 1103. Processing continues in the above-described manner until the Pkt_Cnt value or the WRR_OPP value reaches zero.

If the WRR scheduler determines that the WRR_OPP value is equal to zero (Step 1107, Yes branch), then the WRR scheduler determines a new cycle number $C_{NEW}$, which is equal to "B" plus WRR_CYC. Using the newly calculated $C_{NEW}$ value, the WRR scheduler then reads the Cycle_$C_{NEW}$_Tail_FLID value from round-robin table 300 (Step 1109). If this Cycle_$C_{NEW}$_Tail_FLID value is a null value (Step 1110, Yes branch), then the Cycle_$C_{NEW}$ parameter in idle cycle register 600 is set to a logic "0" value, thereby indicating that this cycle $C_{NEW}$ is now active (Step 1111). The WRR scheduler then updates the Cycle_$C_{NEW}$_Head_FLID and Cycle_$C_{NEW}$_Tail_FLID by setting these values equal to "J" (Step 1112). Processing then proceeds to "Update Cycle B" process (Step 1114).

If this Cycle_$C_{NEW}$_Tail_FLID value is not null value (Step 1110, No branch), then there is already at least one flow queued in cycle $C_{NEW}$. The last flow queued in cycle $C_{NEW}$ is designated "I", such that the Cycle_$C_{NEW}$_Tail_FLID is initially equal to "I". The WRR scheduler updates the Cycle_$C_{NEW}$_Tail_FLID by setting this values equal to "J" (Step 1113). The WRR scheduler also updates the Next_FLID_in_Cyc value in the flow table entry having FLID="I" to store a value of "J" (Step 1113). As described above, this effectively adds the flow table entry having FLID="J" to the end of cycle $C_{NEW}$. Processing then proceeds to "Update Cycle B" process (Step 1114).

FIG. 12 is a flow diagram illustrating "Update Cycle B" process 1114, which is initiated at Step 1200. The WRR scheduler determines whether the Cycle_B_Head_FLID is equal to the Cycle_B_Tail_FLID (Step 1201). If so (Step 1201, Yes branch), then the WRR scheduler has processed all of the flow table entries in cycle "B", and therefore sets the Cycle_B_Head_FLID and the Cycle_B_Tail_FLID equal to a null value (Step 1203). The WRR scheduler then sets the Cycle_B parameter in idle cycle register 600 to a logic "1" value, thereby indicating that cycle B is now idle (Step 1204). The "Update Cycle B" process is then complete (Step 1220), and processing continues with Step 1115 (FIG. 11.)

If the Cycle_B_Head_FLID is not equal to the Cycle_B_Tail_FLID (Step 1201, No branch), then the WRR scheduler reads the Next_FLID_in_Cyc parameter from the flow table entry (having a FLID value equal to "J") (Step 1202). This Next_FLID_in_Cyc parameter is designated "A" in the present example. The WRR scheduler writes the value "A" to the Cycle_B_Head_FLID value (Step 1202), thereby moving the next flow table entry to the head of the queue. The "Update Cycle B" process is then complete (Step 1220), and processing continues with Step 1115 (FIG. 11).

Returning now to FIG. 11, the WRR_OPP value in the flow table entry is set equal to the WRR_BURST value, and the flow table entry is updated (Step 1115). At this time, the dequeue process is complete for the flow table entry (Step 1116). Processing then returns to Step 1101.

Although the invention has been described in connection with several embodiments, it is understood that this invention is not limited to the embodiments disclosed, but is capable of various modifications, which would be apparent to a person skilled in the art. Thus, the invention is limited only by the following claims.

We claim:

1. A weighted round-robin scheduler comprising:
   a round robin table configured to store a plurality of cycle link lists, including one or more active cycle link lists, wherein each active cycle link list includes a head flow identification (FLID) value identifying a first flow of the active cycle link list, and a tail FLID value identifying a last flow of the active cycle link list;
   a flow table having a plurality of flow table entries, wherein each of the flow table entries is associated with a corresponding flow and has a corresponding FLID value, wherein each of the flow table entries includes a weighted round-robin cycle (WRR_CYC) value, which specifies an assigned weight of the corresponding flow, and wherein each of the flow table entries is assigned to one of the cycle link lists in response to the assigned weight using the following equation, $C_{NEW} = (C_{CURRENT} + WRR\_CYC) \bmod (N),$ wherein N represents the number of cycle link lists, $C_{CURRENT}$ represents a current cycle link list to which a flow is currently assigned, and $C_{NEW}$ represents a new cycle link list to which the flow is assigned after the current cycle link list has been processed; and
   a plurality of packet queues, each associated with a corresponding flow table entry, and each configured to store packets of the flow associated with the corresponding flow table entry.

2. The weighted round-robin scheduler of claim 1, wherein the plurality of cycle link lists further include one or more idle cycle link lists, each identifying a cycle of the scheduler where no flows have been scheduled to be processed, the scheduler further comprising an idle cycle register having an idle cycle entry corresponding with each of the cycle link lists, wherein each idle cycle entry identifies the corresponding cycle link list as active or idle.

3. The weighted round-robin scheduler of claim 1, wherein each flow table entry comprises a packet count parameter to indicate a number of packets stored in the associated packet queue.

4. The weighted round-robin scheduler of claim 1, wherein each flow table entry includes:

a flow queue head address pointer to point to a first packet in the associated packet queue; and a flow queue tail address pointer to point to a last packet in the associated packet queue.

5. The weighted round-robin scheduler of claim 1, wherein each packet stored in a packet queue comprises a pre-pended header including a Next_Packet_Address pointer identifying an address of a next packet in the packet queue.

6. The weighted round-robin scheduler of claim 1, wherein each of the flow table entries is stored at an address identified by its corresponding FLID value.

7. The weighted round-robin scheduler of claim 1, wherein each flow table entry includes a pointer to identify a next flow in the same active cycle link list.

8. A method of implementing weighted round-robin scheduling comprising:

receiving a plurality of packets from a plurality of flows, wherein each packet has an associated flow identification (FLID) value that identifies a flow of the packet;

maintaining a flow table having a flow table entry associated with each flow;

assigning a weight to each flow in each flow table entry;

maintaining a packet queue associated with each flow table entry, wherein each packet queue stores the packets of the flow associated with the flow table entry;

maintaining a round robin table having a plurality of cycle link lists, including a plurality of active cycle link lists, wherein each of the active cycle link lists identifies one or more flow table entries associated with flows to be processed during a corresponding cycle;

maintaining a weighted round-robin cycle (WRR_CYC) value in each of the flow table entries, wherein the WRR_CYC value determines the weight of the flow associated with the flow table entry; and scheduling a new cycle, $C_{NEW}$, for a flow table entry in response to the WRR_CYC value of the flow table entry, wherein there are N cycle link lists, the current cycle is designated $C_{CURRENT}$, and the new cycle, $C_{NEW}$, is determined by the following equation:

$C_{NEW}=(C_{CURRENT}+WRR\_CYC) \bmod (N)$.

9. The method of claim 8, wherein the plurality of cycle link lists further include one or more idle cycle link lists, each identifying a corresponding cycle where no flows have been scheduled to be processed, the method further comprising maintaining an idle cycle list that identifies each cycle link list as either an active cycle link list or an idle cycle link list.

10. The method of claim 9, further comprising processing active cycle link lists, but not idle cycle link lists.

11. The method of claim 8, wherein each of the active cycle link lists identifies one or more flow table entries by identifying a head FLID value that identifies a first flow table entry of the active cycle link list, and a tail FLID value that identifies a last flow table entry of the active cycle link list.

12. The method of claim 8, further comprising:

storing a flow queue head address value in each flow table entry, wherein each flow queue head address value identifies an address of a first packet in the packet queue associated with the flow table entry; and storing a flow queue tail address value in each flow table entry, wherein each flow queue tail address value identifies an address of a last packet in the packet queue associated with the flow table entry.

13. The method of claim 12, further comprising pre-pending a header to each of the packets, wherein each header identifies an address of a next packet in the same packet queue.

14. The method of claim 8, further comprising addressing each flow table entry using the FLID value of the associated flow.

15. The method of claim 8, further comprising linking the flow table entries associated with the flows to be processed during the cycle.

16. A method of implementing weighted round-robin scheduling comprising:

receiving a first packet from a first flow having an associated flow identification (FLID) value;

storing the first packet at a first address location in a memory;

linking the first packet to a first flow table entry for the first flow, wherein the first flow table entry includes a first weighted round-robin cycle (WRR_CYC) value that determines the weight of the first flow;

calculating a first new cycle ($C_{NEW}$) in response to the first WRR_CYC value, wherein there are N cycles, and wherein the first new cycle ($C_{NEW}$) is determined by the following equation, wherein $C_{CURRENT}$ represents a current cycle:

$C_{NEW}=(C_{CURRENT}+WRR\_CYC)\bmod(N)$; and adding the flow table entry to the end of the first new cycle ($C_{NEW}$).

17. The method of claim 16, further comprising determining whether the first flow table entry is the only entry of the first new cycle, and if so, then updating a first idle cycle identifier associated with the first new cycle, thereby indicating that the first new cycle is active.

18. The method of claim 16, further comprising determining whether the first packet is the only packet of the first flow stored in the memory, and if so, then linking the first packet to the first flow table entry by writing the first address to a head address field and a tail address field of the first flow table entry.

19. The method of claim 16, further comprising determining whether the first packet is the only packet of the first flow stored in the memory, and if not, then linking the first packet to the first flow table entry by writing the first address to a tail address field of the first flow table entry, and writing the first address to a pre-pended header of a last packet of the first flow stored in the memory.

20. The method of claim 16, further comprising:

maintaining a first burst parameter in the first table entry that indicates a number of packets allowed to be sent during the first new cycle;

maintaining a first opportunity parameter in the first flow table entry that represents the number of packets actually sent from the first flow during the first new cycle; and maintaining a packet count parameter in the first flow table entry that represents the number of packets stored for the first flow.

21. The method of claim 20, further comprising de-queuing a number of packets equal to either the first burst parameter or the packet count parameter, whichever is less, during the first new cycle.

22. A weighted round-robin scheduler comprising:

a plurality of packet queues, each configured to store packets of a corresponding flow;

a round robin table configured to store a plurality of cycle link lists, wherein each cycle link list identifies any flows to be processed during a corresponding cycle of the scheduler; and a flow table having a plurality of flow table entries, wherein each of the flow table entries is associated with a corresponding flow, wherein each of the flow table entries includes a weighted round-robin cycle (WRR_CYC) value, which specifies an assigned weight of the corresponding flow;

means for assigning each flow to one of the cycle link lists in accordance with the following equation, $C_{NEW} = (C_{CURRENT} + WRR\_CYC) \bmod (N)$, wherein N represents the number of cycle link lists, $C_{CURRENT}$ represents a current cycle link list to which a flow is currently assigned, and $C_{NEW}$ represents a new cycle link list to which the flow is assigned after the current cycle link list has been processed.

* * * * *